A. C. STOESSIGER,

Assignor to H. RENDTORFF.

Stove Board.

No. 9,316. Reissued July 20, 1880.

Attest:

Emil H. Poormann

Oliver W. Mosble

INVENTOR:

Augustus C. Stoessiger

By Lotz & Dyer

Attorneys.

N. PETERS, PHOTO-LITHOGRAPHER, WASHINGTON, D. C.

UNITED STATES PATENT OFFICE.

AUGUSTUS C. STOESSIGER, OF CHICAGO, ILLINOIS, ASSIGNOR TO HERMANN RENDTORFF, OF SAME PLACE.

STOVE-BOARD.

SPECIFICATION forming part of Reissued Letters Patent No. 9,316, dated July 20, 1880.

Original No. 209,085, dated October 15, 1878. Application for reissue filed May 14, 1880.

*To all whom it may concern:*

Be it known that I, AUGUSTUS C. STOESSIGER, of Chicago, in the county of Cook and State of Illinois, have invented a certain new and useful Improvement in Stove-Boards; and I do hereby declare that the following is a full, clear, and exact description of the construction and operation of the same, reference being had to the annexed drawings, making a part of this specification, and to the letters and figures of reference marked thereon.

Figure 1:
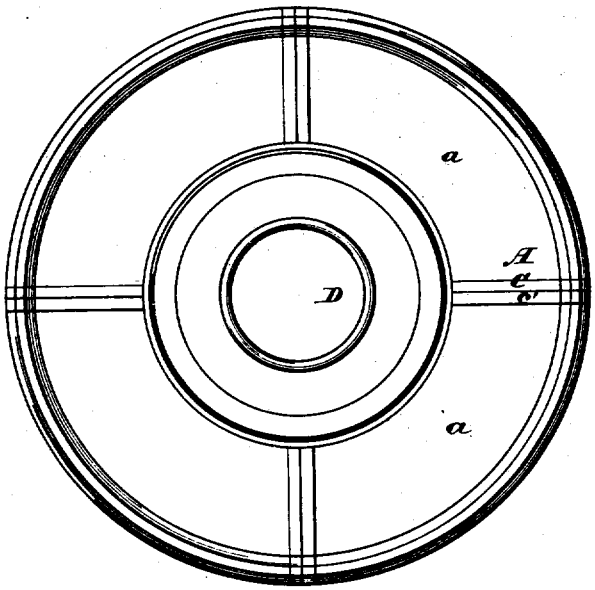
Figure 2:
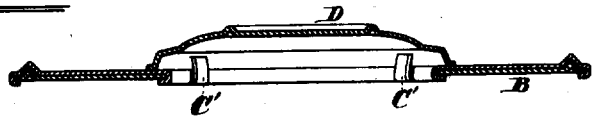
Figure 3:
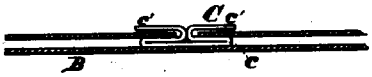

Figure 1 of the drawings is a representation of a plan of my stove-board. Fig. 2 is a vertical central sectional view of the same, and Fig. 3 is a sectional detail view.

My invention relates to a platform or support adapted to be placed under stoves; and the novelty consists in the construction and arrangement of the parts, as will be fully hereinafter set forth, and pointed out by the claims.

The platform proper is made in annular sections with radial joints, and it is provided with an open center and studs to receive a dome, which dome is, when in position, directly under the stove. The upper surface of the platform is of crystallized tin, and it is suitably ornamented. This ornamented tin surface is secured to a wood or sheet-iron base, and non-conducting material may be placed between, if desired. When the base is of wood the tin is made to embrace the periphery and clasp a portion of the under outer edge and is corrugated.

A clasp for the radial joints of the annular sections is formed of one strip of metal, each edge bent lengthwise inwardly upon itself to form the lower plate, and then outwardly to form the upper surface. This clasp secures the sections together, and the inner end of each is turned up to form a lug, against which the dome abuts.

Referring to the drawings, A represents the upper surface of the platform, made of crystallized tin, ornamented to suit, in sections *a*, with radial joints; and B, the base, of wood or metal, to which it is secured.

C represents the clasp, so formed as to present a bottom plate, *c*, and an upper duplex plate, *c'*. This clasp is radially arranged, and it secures the sections together. The inner ends are turned up at C', to form lugs or stops for the dome D, which may be of a separate piece, removable, to allow dust, &c., to be cleaned from under it; or it may be secured to the platform.

I ornament the upper side, and over such ornamentation I paint with shellac, Japan, or other fire-proof varnish, and then bake it. This protects the ornamentation and gives a good finish.

The defect or insufficiency in the specification of the original Letters Patent lay in the want of a description of the purposes and advantages of the peculiar construction of the stove-board and in the omission of claims based thereon. Such advantages may be enumerated as follows:

First, crystallized tin, as a covering for the base of stove-boards, has none of the defects of zinc, the material heretofore used. It can be heated to a high degree to properly bake the transparent varnish thereon without injury to the tin, which cannot be done with zinc, and therefore the zinc boards are not varnished. Consequently the crystallized and varnished tin stove-boards do not oxidize or show finger-marks, and will retain their brightness and beauty of finish for a long time. The crystallized-tin stove-boards can also be handsomely ornamented, since the varnish protects the ornamentation. The zinc stove-boards cannot be given a bright smooth finish that will be durable, and cannot be durably ornamented, since the varnish, which must be baked on at a temperature higher than zinc can withstand, would crack off, destroying the finish and leaving the ornamentation exposed to wear.

Second, by making the crystallized-tin top of the stove-board in sections, a cheaper stove-board can be produced than if made of one piece of tin, since smaller and cheaper sheets of tin can be used, there is less waste in cutting up the material, and the tin can be more easily bent around the edges of the base.

Third, the clasps C form slip-joints with the edges of the tin sections, so that such sections can move more or less toward and away from each other, to accommodate themselves to the expansion and contraction of the different parts of the stove-board without wrinkling or springing at any point.

What I claim as new, and desire to secure by Letters Patent, is—

1. As a new article of manufacture, a stove-board composed of a base and a top of crystallized tin covered with a varnish baked thereon, substantially as described.

2. As a new article of manufacture, a stove-board composed of a base and a top of crystallized tin made in sections and covered with a varnish baked thereon, substantially as described.

3. As a new article of manufacture, a stove-board composed of a base and a top made in sections connected by slip-joints, substantially as and for the purpose set forth.

4. In a stove-board, the combination of base B with top A, made in sections *a*, and the clasps C, forming slip-joints between the sections, substantially as described and shown.

5. The ornamental stove-support described, consisting of the platform A, made in sections *a*, with radial joints, secured to the base B, clasp C, of one piece of metal, bent, as described, to form the plates *c c′*, and lugs C′, and the dome D, constructed, adapted, arranged, and operating as set forth, for the purpose specified.

In testimony that I claim the above I have hereunto subscribed my name in the presence of two witnesses.

AUGUSTUS C. STOESSIGER.

Witnesses:

OLIVER W. MARBLE,
EMIL H. FROMMANN.